(12) United States Patent
Ostrovsky et al.

(10) Patent No.: US 8,627,018 B2
(45) Date of Patent: Jan. 7, 2014

(54) AUTOMATIC OPTIMIZATION FOR PROGRAMMING OF MANY-CORE ARCHITECTURES

(75) Inventors: Igor Ostrovsky, Redmond, WA (US); Zachary David Johnson, Valley Center, CA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 13/300,464

(22) Filed: Nov. 18, 2011

(65) Prior Publication Data

US 2013/0132684 A1 May 23, 2013

(51) Int. Cl.
*G06F 12/10* (2006.01)
(52) U.S. Cl.
USPC .......................................... 711/147
(58) Field of Classification Search
None
See application file for complete search history.

(56) References Cited

U.S. PATENT DOCUMENTS

| | | |
|---|---|---|
| 2010/0218196 A1 | 8/2010 | Leung et al. |
| 2011/0057935 A1 | 3/2011 | Fowler |
| 2011/0078226 A1 | 3/2011 | Baskaran et al. |
| 2011/0078692 A1 | 3/2011 | Nickolls et al. |

OTHER PUBLICATIONS

Yang, et al., "A GPGPU Compiler for Memory Optimization and Parallelism Management", In Proceedings of the ACM SIGPLAN Conference on Programming Language Design and Implementation, Jun. 5-10, 2010, 12 pages.
Pimple, et al., "Architecture Aware Programming on Multi-core Systems", In International Journal of Advanced Computer Science and Applications, vol. 2, Issue 6, 2011, pp. 105-111.
Chen, et al., "Tiled-Map Reduce: Optimizing Resource usages of Data-parallel Applications on Multicore with Tiling", In Proceedings of the 19th International Conference on Parallel Architectures and Compilation Techniques, Sep. 11-15, 2010, 12 pages.
Uen, et al., "CUDA-lite: Reducing GPU Programming Complexity", In Book of Languages and Compilers for Parallel Computing, 2008, pp. 1-15.
Hong, et al., "Memory-level and Thread-level Parallelism Aware GPU Architecture Performance Analytical Model", Retrieved on: Sep. 7, 2011, Available at: http://citeseerx.ist.psu.edu/viewdoc/download?doi=10.1.1.167.431&rep=rep1&type=pdf.

*Primary Examiner* — Duc Doan
(74) *Attorney, Agent, or Firm* — Workman Nydegger

(57) ABSTRACT

The present invention extends to methods, systems, and computer program products for automatically optimizing memory accesses by kernel functions executing on parallel accelerator processors. A function is accessed. The function is configured to operate over a multi-dimensional matrix of memory cells through invocation as a plurality of threads on a parallel accelerator processor. A layout of the memory cells of the multi-dimensional matrix and a mapping of memory cells to global memory at the parallel accelerator processor are identified. The function is analyzed to identify how each of the threads access the global memory to operate on corresponding memory cells when invoked from the kernel function. Based on the analysis, the function altered to utilize a more efficient memory access scheme when performing accesses to the global memory. The more efficient memory access scheme increases coalesced memory access by the threads when invoked over the multi-dimensional matrix.

20 Claims, 7 Drawing Sheets

AUTOMATIC OPTIMIZATION FOR PROGRAMMING OF MANY-CORE ARCHITECTURES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, execution of a software program is split between multiple processors within the same computer system. For example, some computer systems comprise one or more Central Processing Units ("CPUs") along with other types of processors, such as one or more parallel accelerator processors. One type of parallel accelerator processor, for example, is a Graphics Processing Unit ("GPU"), which contains a plurality of processor cores, and which is optimized for executing parallel algorithms over large (and often multi-dimensional) data domains. Some compilers are capable of compiling source code into executable code that executes in part on one or more CPUs and that executes in part on one or more GPUs. Thus, source code can be specifically developed for mixed execution on CPUs and GPUs.

Generally, software developers leveraging GPUs or other parallel processors write kernels, or functions that are invoked over a data domain. GPUs execute a kernel by invoking the kernel as a plurality of parallel threads that each executes instructions of the kernel. The threads are organized into thread blocks which each contain a different subset of the plurality of threads. Threads in the same thread block execute on the same core within a GPU and can communicate efficiently with one another via tiles of thread-shared memory. Thread blocks are further arranged into grids, which may have many dimensions (e.g., one, two, or three). For example, a programmer developing a kernel function that executes over a domain comprising a 1024×1024 matrix of data may specify grid dimensions (e.g., 64×64 thread blocks), thread block dimensions (e.g., 16×16 threads per thread block), and a single function (i.e., a kernel) that all threads will execute when operating over the matrix. An instance of the kernel is invoked for each cell in the matrix as a different thread.

GPUs execute threads in the same thread block together at a single processing core of the GPU as part of warps. For example, an exemplary thread block which includes 16×16 threads (i.e., 256 threads) may be executed as a plurality of warps, each comprising 16 or 32 threads, depending on the GPU hardware. During execution of a warp, threads may access global memory at the GPU, and/or may access thread-shared memory (i.e., memory shared by threads executing a particular core). When threads in the same warp access memory locations that are next to or near each other in global memory, the GPU hardware can efficiently group accesses by different threads into a single memory transaction. Efficiently grouping global memory accesses by a plurality threads in the same warp into a single memory transaction is known as 'memory coalescing'. By contrast, when threads in a warp access memory locations that are far apart in global memory, each thread in the warp generates a different memory transaction, which negatively affects performance.

BRIEF SUMMARY

The present invention extends to methods, systems, and computer program products for automatically optimizing memory accesses by kernel functions executing on parallel accelerator processors. In some embodiments, a function is accessed. The function is configured to be invoked as a plurality of threads on a parallel accelerator processor to operate over a multi-dimensional matrix of memory cells. Each thread is configured to operate on a corresponding memory cell in the multi-dimensional matrix.

A layout of the memory cells of the multi-dimensional matrix, along with how the memory cells map to global memory at the parallel accelerator processor is identified. Subsequently, the function is analyzed by identifying how each of the threads access the global memory to operate on corresponding memory cells when invoked over the multi-dimensional matrix. Based on the analysis, the function is altered to utilize a more efficient memory access scheme when performing accesses to the global memory. The more efficient memory access scheme, which is based on the layout of the memory cells and on the analysis of the function, increases coalesced memory access by the threads when invoked over the multi-dimensional matrix.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
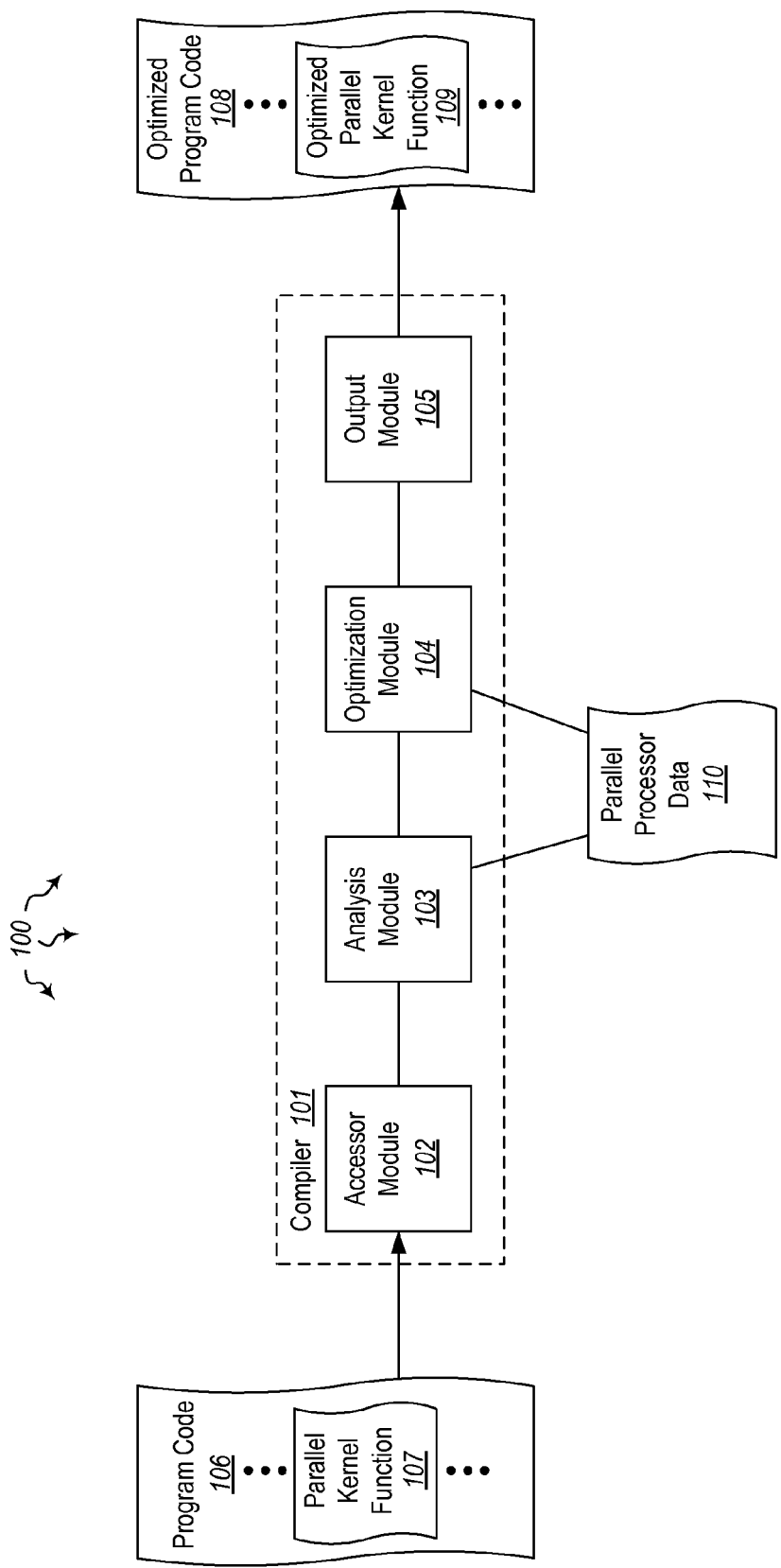
FIG. 1 illustrates an example computer architecture that facilitates automatically optimizing memory accesses by functions executing on parallel accelerator processors.

The present invention extends to methods, systems, and computer program products for automatically optimizing memory accesses by kernel functions executing on parallel accelerator processors. In some embodiments, a function is accessed. The function is configured to be invoked as a plurality of threads on a parallel accelerator processor to operate over a multi-dimensional matrix of memory cells. Each thread is configured to operate on a corresponding memory cell in the multi-dimensional matrix.

A layout of the memory cells of the multi-dimensional matrix, along with how the memory cells map to global memory at the parallel accelerator processor is identified. Subsequently, the function is analyzed by identifying how each of the threads access the global memory to operate on corresponding memory cells when invoked over the multi-dimensional matrix. Based on the analysis, the function is altered to utilize a more efficient memory access scheme when performing accesses to the global memory. The more efficient memory access scheme, which is based on the layout of the memory cells and on the analysis of the function, increases coalesced memory access by the threads when invoked over the multi-dimensional matrix.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As used in the description and the claims, a "warp" is defined as a group of threads in the same thread block executing together at a single core of a parallel accelerator processor.

FIG. 1 illustrates an example computer architecture 100 that facilitates automatically optimizing memory accesses by functions executing on parallel accelerator processors. As depicted, computer architecture 100 may include a variety of components and data, such as compiler 101, program code 106, and parallel processor data 110. Each of the depicted components and data can be connected to one another over a system bus and/or over (or be part of) a network, such as, for example, a Local Area Network ("LAN"), a Wide Area Network ("WAN"), and even the Internet.

Generally, compiler 101 can include hardware and/or software components that transform a source computing language into a destination computing language. For example, compiler 101 can translate "higher-level" source code of a programming language (e.g., C#, VISUAL BASIC, JAVA, JAVASCRIPT, etc.) into "lower-level" instructions (e.g., assembly language/machine code, intermediate language code, etc.). The instructions can then be executed by one or more physical and/or virtual computing systems, by one or more managed runtime environments, etc. The lower-level instructions can also be subject to further processing or translation.

In some embodiments, compiler 101 is configured to receive and transform source code for a variety of programming languages into one or more types of lower-level instructions. For example, compiler 101 can be configured to generate lower-level instructions configured for execution on one or more general purpose processors (either physical or virtual) as well as lower-level instructions configured for execution on one or more parallel accelerator processors (e.g., one or more Graphical Processing Units ("GPUs")). In other embodiments, compiler 101 is configured to translate source code of a single programming language or multiple programming languages into a single type of lower-level instructions, such as lower-level instructions configured for execution on one or more GPUs.

As depicted, compiler 101 can be configured with one or more modules that access and process program code 106. These modules can include accessor module 102, analysis module 103, optimization module 104, and output module 105.

Accessor module 102 is configured to receive or access program code which can include one or more parallel kernel functions. The parallel kernel functions operate over a data domain and are capable of being offloaded to one or more parallel accelerator processors (e.g. GPUs). As depicted, accessor module 102 accesses program code 106. Program code 101 contains parallel kernel function 107. In some embodiments, accessor module 102 accesses program code which is being compiled offline for later execution. In other embodiments accessor module 102 accesses program code which is being compiled "just in time" for substantially immediate execution.

Parallel kernel function 107 can include instructions for operating over a data domain as a plurality of threads executing at a parallel accelerator processor, wherein a different thread of kernel function 107 is instantiated for each data cell in the data domain. Kernel function 107 is typically configured to be executed using a plurality of processing cores of a parallel accelerator processor. Parallel accelerator processors typically include global memory accessible to all threads. Global memory is generally relatively slow to access. Parallel accelerator processors also typically include shared memory accessible only to threads in the same thread block executing at a processing core. Shared memory is generally relatively quickly accessed by thread in the same thread block.

Figure 2:
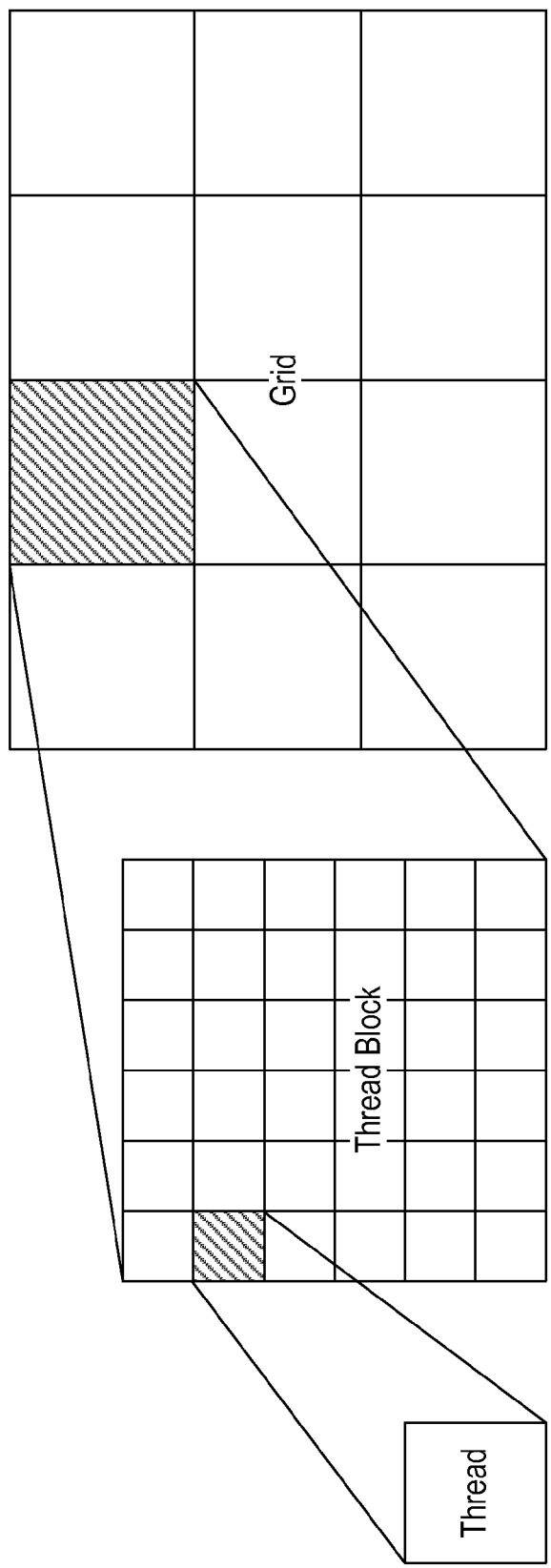
FIG. 2 illustrates an exemplary arrangement of threads executing over a data domain.

Referring briefly to FIG. 2, for example, FIG. 2 illustrates an arrangement of threads executing over a data domain (e.g., memory cells in a data matrix). In the depicted example, a kernel function is executing over a data domain comprising a two-dimensional data matrix (e.g., 24×18 or 432 data cells/memory locations). As such, the kernel function can be instantiated as a plurality of threads (e.g., 432 threads) which execute over the data domain. The threads may be grouped into thread blocks organizing a plurality of threads (e.g., 6×6 threads per thread block, or 36 threads). The thread blocks may in turn be arranged as a grid (e.g., a 3×4 grid or 12 thread blocks). Threads in each thread block execute together at a core of the parallel accelerator processor as one or more warps. Threads in the same thread block have access to the same thread-shared memory.

Returning to FIG. 1, analysis module 103 is configured to receive program code from accessor module. Analysis module 103 analyzes any functions written for execution on parallel accelerator processors to ascertain their memory mappings, their memory access patterns, and any other information useful for optimizing functions for execution on parallel accelerator processors. As such, analysis module 103 can be configured to analyze kernel function 107 to ascertain how threads of kernel function 107 would access global memory, when executed. Many different types of analysis are possible.

Figure 3:
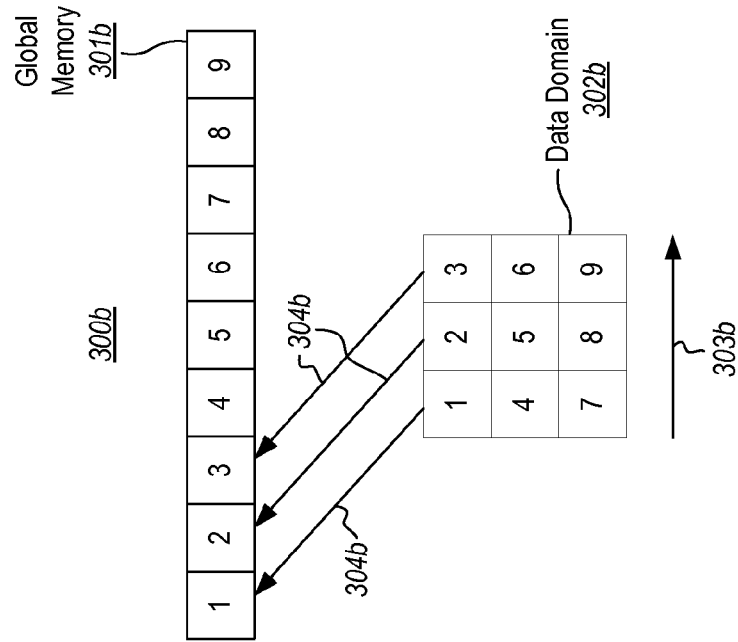
FIG. 3 illustrates exemplary memory mappings and memory access patterns by a warp of threads that are executing a kernel function over a data domain.
Figure 3:
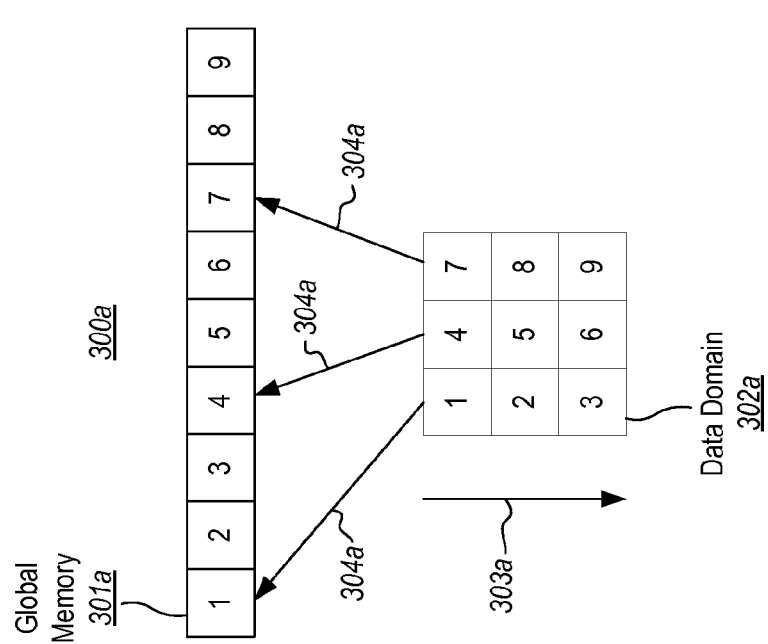

For example, FIG. 3 illustrates exemplary memory mappings and memory access patterns by a warp of threads that are executing kernel function 107 over a data domain. As depicted by access pattern 300a, data domain 302a (or a portion thereof) may be arranged for access using a column-major grid orientation, as indicated by arrow 303a. In access pattern 300a, a warp of threads accesses global memory 301a using a row-major access scheme. As depicted, access pattern 300a accesses locations in global memory 301a that are not adjacent (as indicated by arrows 304a). As such, accesses by access pattern 300a are less efficiently performed, because each memory access would typically use a different memory transaction.

By contrast, access pattern 300b uses data domain 302b arranged for access using a row-major grid orientation, as indicated by arrow 303b. For access pattern 300b, when a corresponding warp of threads accesses global memory 301b using a row-major access scheme, those accesses are more likely be to adjacent locations in global memory 301b (as indicated by arrows 304b). At least some of these memory accesses may therefore be coalesced into a single memory transaction for a plurality of threads in the warp.

As such, knowledge of memory mappings and access schemes can provide insight into more efficient ways for kernel function 107 to access memory (e.g., a more efficient grid orientation). While FIG. 3 depicts embodiments of row-major versus column-major accesses and mappings, one will appreciate that more complicated access schemes and mappings are also possible.

As depicted in FIG. 1, analysis module 103 can access parallel processor data 110. Parallel processor data 110 can comprise a database or library providing information about one or more parallel accelerator processors. Program code 106 can be compiled for an execution on the one or more parallel accelerator processors by compiler 101. Parallel processor data 110 provides any appropriate information about relevant parallel accelerator processors, such as memory information (e.g., amount and layout of global and/or shared memory), processor core information, thread warp requirements and capabilities, etc. Parallel processor data 110 can be used by analysis module 103 when ascertaining memory mappings and memory access patterns, among other things.

Optimization module 104 is configured to receive any information obtained by analysis module 103 and to re-write functions written for execution on parallel accelerator processors for more efficient memory usage (e.g., increased coalescing, prioritization of uncoalesced accessed, etc.) during execution. For example, after analysis module 103 ascertains memory mappings and memory access patterns of kernel function 107, optimization module can automatically re-write kernel function 107 for optimized memory access. Optimization may include choosing a more efficient grid orientation, caching within thread-shared memory, prioritizing uncoalesced memory accesses, etc.

As depicted, optimization module 104 may also access parallel processor data 110 when re-writing functions. Similar to analysis module 103, optimization module 104 can use parallel processor data 110 to gather any appropriate information about one or more target parallel accelerator processors, which optimization module 104 can leverage when re-writing functions.

After optimization module 104 rewrites functions for more efficient memory usage, optimization module 104 can provide the optimized kernel functions to output module 105. Output module 105 is configured to provide optimized program code 108, including at least one optimized parallel kernel function 109, to another component for further processing.

In some embodiments, output module 105 outputs program code for execution at a later time. For example, compiler 101 can compile program code 106 "off line" and output module 105 can provide optimized program code 108 to other components in a compiler suite (e.g., for linking or packaging into an executable application). In other embodiments, compiler 101 can compile program code 106 "just in time" for immediate execution, and output module 105 can output program code to a runtime environment for substantially immediate execution.

Figure 4:
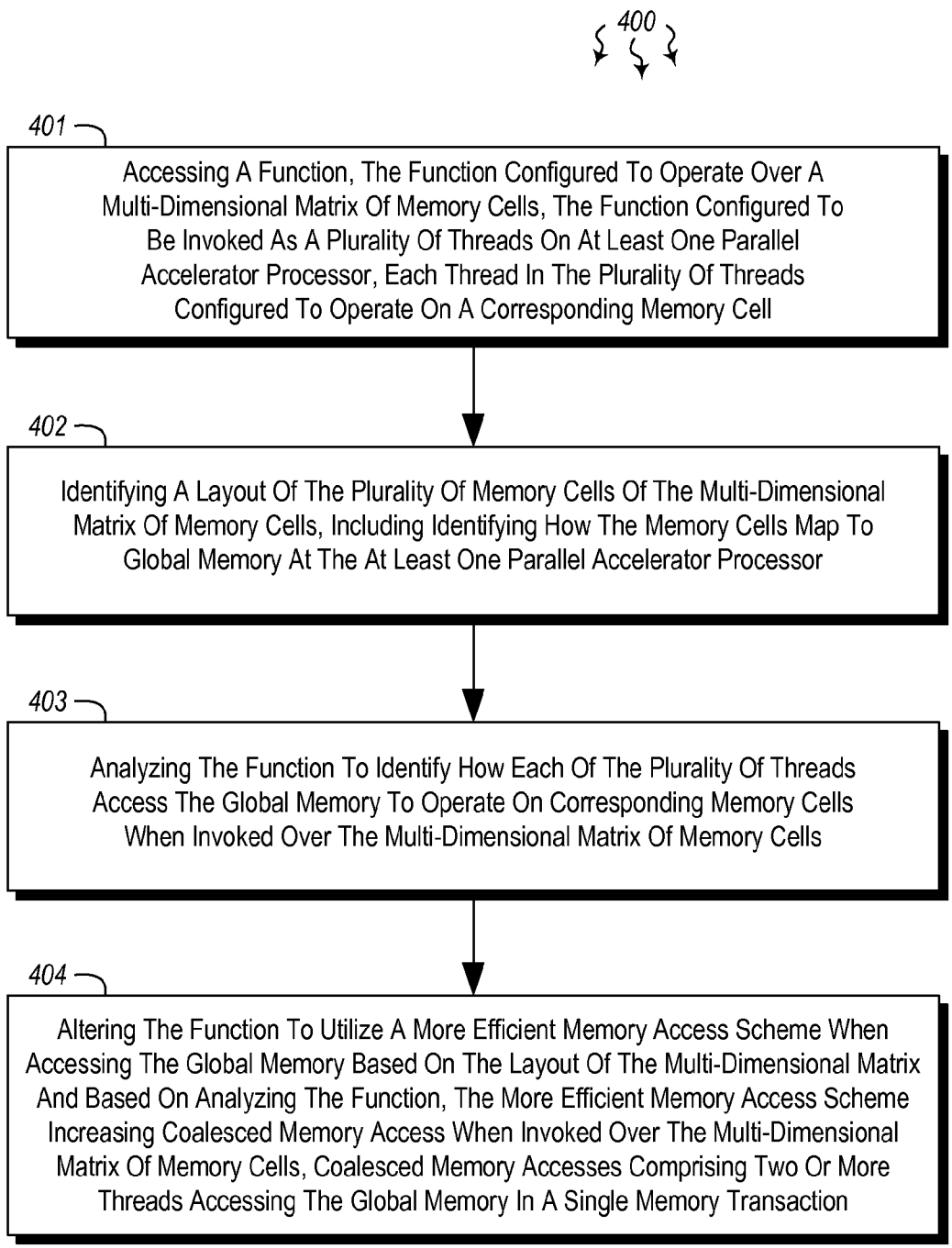
FIG. 4 illustrates a flow chart of an example method for automatically optimizing a function for execution on one or more parallel accelerator processors.

FIG. 4 illustrates a flow chart of an example method 400 for automatically optimizing a function for execution on one or more parallel accelerator processors. Method 400 will be described with respect to the components and data of computer architecture 100.

Method 400 includes an act of accessing a function, the function configured to operate over a multi-dimensional matrix of memory cells, the function configured to be invoked as a plurality of threads on at least one parallel accelerator processor, each thread in the plurality of threads configured to operate on a corresponding memory cell (act 401). For example, accessor module 102 may access program code 106. Program code 106 may include kernel function 107, including code configured to be executed over a data domain by a parallel accelerator processor as a plurality of threads. For example, kernel function 107 may be configured to be executed a plurality of threads corresponding to a number of data cells in a multi-dimensional matrix. As depicted in FIG. 2, threads may be configured to execute as a grid of thread blocks. Each thread block may include a plurality of the threads. Each thread block may be configured to execute at different cores of the parallel accelerator processor as one or more warps of threads.

Method 400 also includes an act of identifying a layout of the plurality of memory cells of the multi-dimensional matrix of memory cells, including identifying how the memory cells map to global memory at the at least one parallel accelerator processor (act 402). For example, analysis module 103 can receive kernel function 107 from accessor module 102 and analyze a layout of global memory at the least one parallel accelerator and a manner in which memory cells in the multi-dimensional matrix are laid out. For example, FIG. 3 illustrates that a data domain may be laid out in row- or column-major grid orientations, or in any other appropriate manner.

Method 400 also includes an act of analyzing the function to identify how each of the plurality of threads access the global memory to operate on corresponding memory cells when invoked over the multi-dimensional matrix of memory cells (act 403). For example, analysis module 103 can analyze kernel function 107 to ascertain how memory accesses will occur when operating over the multi-dimensional matrix. In particular, kernel function 107 can analyze memory accesses to identify whether memory accesses by different threads will occur at adjacent memory locations in global memory (and be subject to coalescing), or whether memory accesses by different threads would occur at distant memory locations in global memory (and be uncoalesced). For example, analysis module 103 may determine that memory accesses by different threads would coalesce more frequently when accessing the multi-dimensional matrix using one grid orientation versus another grid orientation (e.g., row-major access versus column-major access, or vice versa).

Method 400 also includes an act of altering the function to utilize a more efficient memory access scheme when accessing the global memory based on the layout of the multi-dimensional matrix and based on analyzing the function, the more efficient memory access scheme increasing coalesced memory access invoked over the multi-dimensional matrix of memory cells, coalesced memory accesses comprising two or more threads accessing the global memory in a single memory transaction (act 404). For example, based on the analysis by analysis module 103, optimization module 104 can re-write kernel function 107 to produce optimized parallel kernel function 109. Re-writing kernel function 107 can involve any appropriate optimization which causes threads instantiated from kernel function 107 to more efficiently use global and shared memory.

For example, optimization module 104 may re-write kernel function 107 to choose a more efficient grid orientation of the multi-dimensional matrix to use when performing memory accesses. As such, optimization module 104 may "rotate" the multi-dimensional matrix to change the access scheme of the data domain (i.e., row-major to column-major, or vice versa).

For example, if kernel function 107 were configured to increment each value in a 1024×1024 matrix M which is stored in row-major order, kernel function 107 may be instantiated as $1024^2$ threads, each responsible for incrementing the value of one cell in matrix M. When determining which cell within matrix M a particular thread should increment, optimization module 104 may consider two possible grid orientations:

A. thread (i,j) increments M[i,j]
B. thread (i,j) increments M[j,i]

It is important to consider which threads execute as a warp, as global memory accesses by threads in the same warp may coalesce. For example, threads (x,y), (x+1,y) . . . (x+15,y) (i.e., sixteen threads) may execute in the same warp. Given this warp, grid orientation 'A' would likely result in coalesced access to global memory by the threads in the warp. This is because threads (0,0), (0,1), . . . (0,15) would increment memory locations M[0,0], M[0,1], . . . M[0,15] and because these memory locations are likely adjacent in memory by virtue of matrix M being stored in row-major format. By contrast, grid orientation 'B' would likely result in uncoalesced access to global memory by threads in the warp. This is because threads (0,0), (0,1), . . . (0,15) would increment memory locations M[0,0], M[1,0], . . . M[15,0]. As such, optimization module 104 may re-write kernel function 107 to use grid orientation 'A'.

Analysis module 103 and optimization module 104 can perform any number of memory optimizations. For example, an additional optimization may include transposing matrices using read-side tiles and/or write-side tiles of thread-shared memory. Kernel function 107 may operate to receive matrix M1 as input and transpose matrix M1 to generate output matrix M2. In this situation, optimization module 104 may consider two possible transposition schemes:

A. thread (i,j) assigns M2[i,j] to M1[j,i]
B. thread (i,j) assigns M2[j,i] to M1[i,j]

Using either scheme, one of the two memory operations (either the read from M1 or the write to M2) will result in uncoalesced accesses to global memory. However, optimization module 104 can increase the likelihood of memory accesses coalescing by utilizing thread blocks and tiles of thread-shared memory. For example, threads in the same thread block can participate in a two-step read process. First, the threads can cooperatively load data into a tile of thread-shared memory using coalesced reads (e.g., copy a tile of M1 into thread-shared memory). Second, the threads can read from the thread-shared memory instead of from global memory (e.g., write out the transposed tile into M2). Reads from thread-shared memory are relatively fast, so coalescing is less of a concern during these reads. Thus, by utilizing thread-shared memory to communicate with one another, threads in the thread block can avoid uncoalesced memory accesses.

Figure 5B:
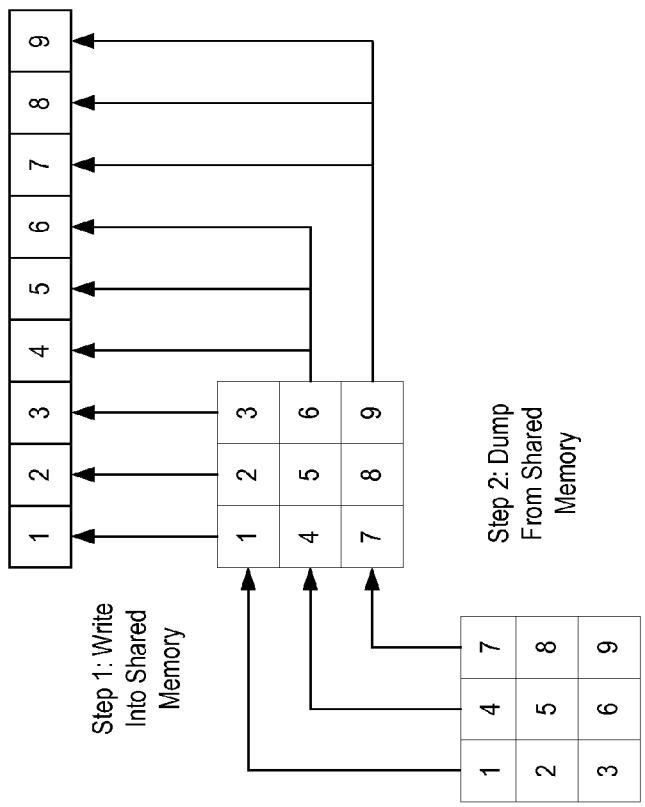
FIG. 5B illustrates an example of a two-step write to global memory.
Figure 5A:
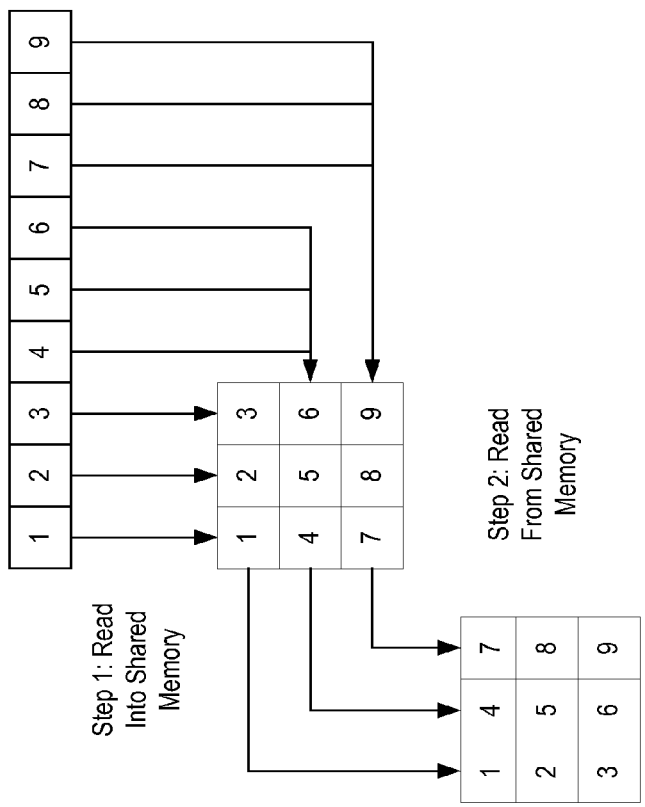
FIG. 5A illustrates an example of a two-step read from global memory.

FIG. 5A illustrates an example of a two-step read from global memory, in which threads in the same thread block read from global memory into thread-shared memory, and then read from the thread-shared memory. A similar process works in reverse for writes. FIG. 5B illustrates an example of a two-step write to global memory, in which threads in the same thread block dump data into a tile of thread-shared memory, and then perform a cooperative coalesced write to global memory.

Figure 6A:
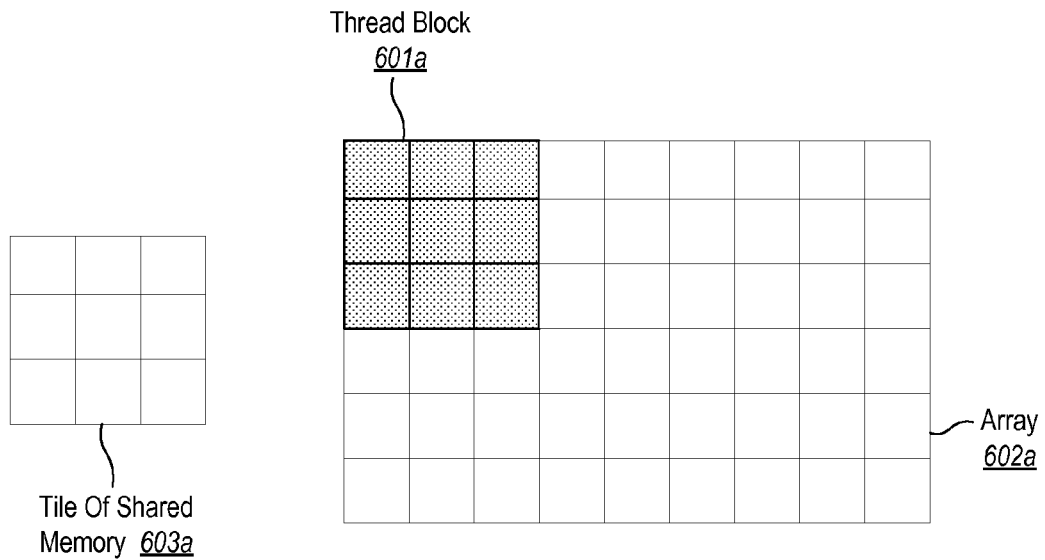
FIG. 6A illustrates an embodiment of using simple tiling to cache values in thread-shared memory.

Additional optimizations exist which also use tiling (i.e., copying data from global memory to thread-shared memory). For example, FIG. 6A illustrates an embodiment of using simple tiling to cache values in thread-shared memory. Simple tiling is useful when each thread in a thread block (e.g., thread block 601a) reads one element in an array (e.g., array 602a). To employ simple tiling, optimization module 104 can re-write kernel function 107 to load respective elements of thread block 601a into tile of shared memory 603a, eliminating the need for further reads from global memory when later accessing those values.

Figure 6B:
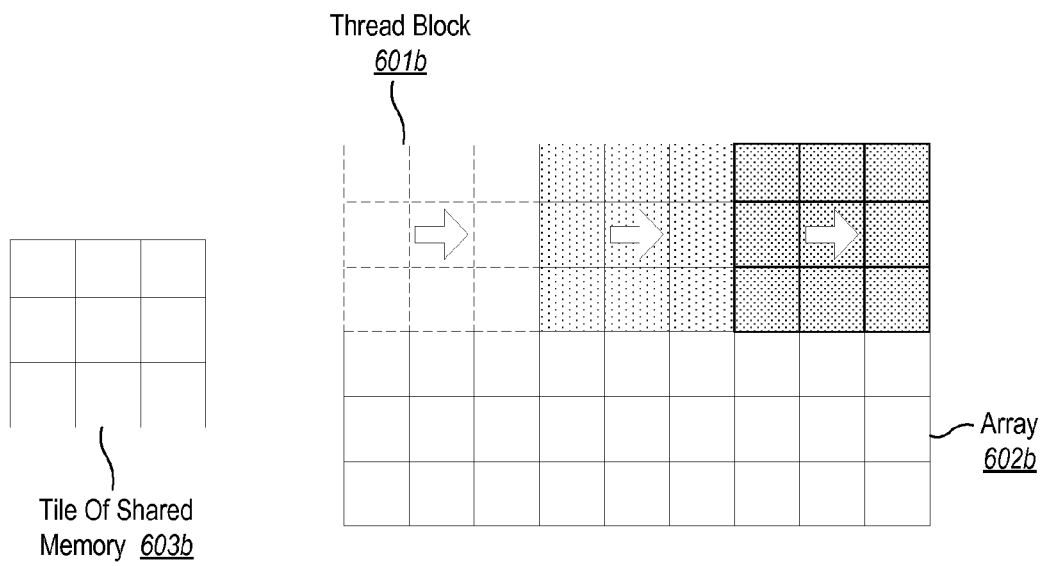
FIG. 6B illustrates an embodiment of enumerated tiling to cache values in thread-shared memory.

FIG. 6B illustrates an embodiment of using enumerated tiling to cache values in thread-shared memory. Enumerated tiling is useful when threads in a thread block (e.g., thread block 601b) read a dimension of an array (e.g., array 602b), and in which successive blocks of the array should be read in that dimension. This situation may exist when one or more indices for memory reads and/or writes are based upon an iteration variable.

To employ enumerated tiling, optimization module 104 may re-write kernel function 107 so that an original loop defining the iteration variable is transformed into an outer loop and an inner loop. The outer loop iterates for the duration of the original loop in tile-sized chunks, and loads the values for the current tile-sized chunk into tile of shared memory 603b. The inner loop iterates over the tile of shared memory and contains the body of the original loop.

For example, a "for" loop such as:

```
for (int k = 0 ; k < m1.GetLength(1); k++)
{
    sum = sum + m1[i, k];
}
``` may be transformed by optimization module 104 into a shared memory version that includes an outer loop and an inner loop, such as:

```
for (int displacement = 0; displacement < m1.GetLength(1);
displacement += 16)
{
    float[,] sharedMemory = new float [16, 16];
    sharedMemory[threadY, threadX] = m1[i, displacement + threadX];
    for (int k = 0; k < 16; k++)
    {
        sum = sum + sharedMemory[threadY, k];
    }
}
```

Figure 7:
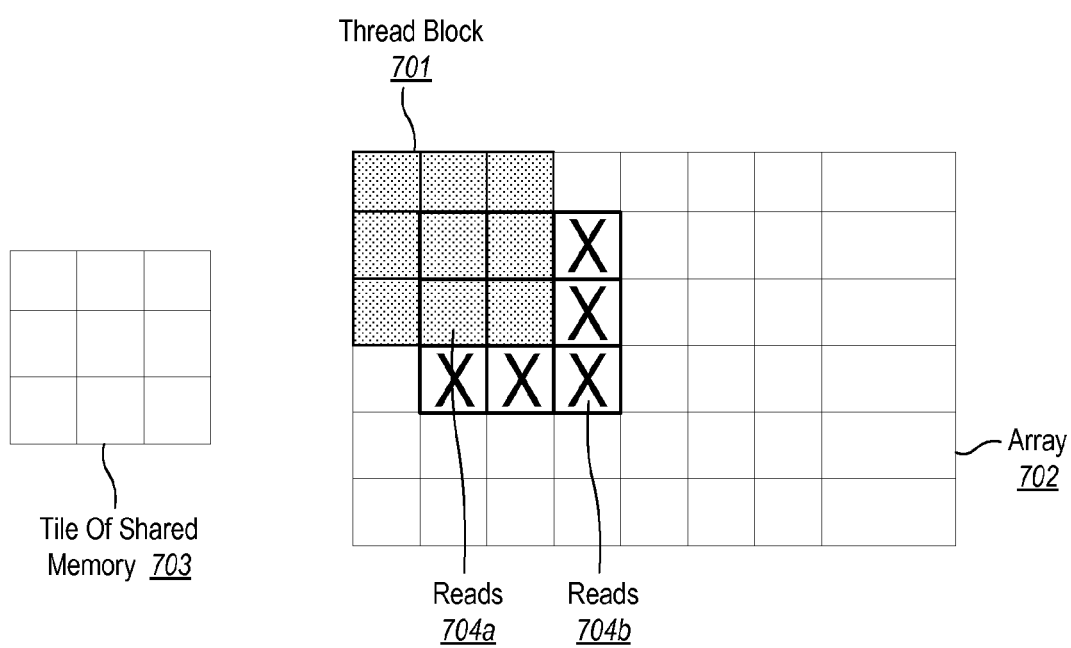
FIG. 7 illustrates an embodiment of combining tiles for accesses with offsets.

In yet an additional optimization, if two or more memory reads differ only by a small offset (e.g., [i,j] and [i+1, j+1]), then a tile of shared memory may be shared among them. As such, optimization module 104 may combine tiles for access with offsets (e.g., accesses M[a,b] and M[a+1,b] can be served from the same tile of shared memory, except for the boundary value). For example, FIG. 7 illustrates that tile of shared memory 703 can service reads 704a by thread block 701 from array 702, but may not be used to service reads 704b.

In addition, optimization module 104 can optimize kernel function 107 to cache and prioritize uncoalesced memory accesses (reads and writes). For example, optimization module 104 can determine important (e.g., more frequent) uncoalesced reads from global memory and then use a cooperative coalesced read from global memory to place these values in shared memory. Likewise, optimization module 104 can determine important uncoalesced writes to global memory, place values associated with these writes in shared memory, and use a cooperative coalesced write to global memory from the shared memory. Because shared memory is limited, optimization module 104 can prioritize use of shared memory by uncoalesced memory accesses, such as by giving priority to access that occur multiple times (e.g., access inside a loop).

Furthermore, although a read from global memory may occur in a coalesced manner, if that read occurs multiple times it may be more efficient for optimization module 104 to store that value in shared memory, and then subsequently access that value from shared memory instead of global memory.

When using tiling, optimization module 104 can prioritize memory accesses that leverage tiling and to limit the number of tiles used by each thread block. Generally, a parallel accelerator processor has a limited amount of shared memory. As such, optimization module 104 can choose memory operations that would benefit more from tiling, and use a limited number of tiles to optimize these operations. In other words, optimization module 104 can avoid exceeding a defined number of tiles of shared memory by optimized parallel kernel function 109 (and by extension, each thread block).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system which includes system memory and one or more processors, a method for automatically optimizing a function for execution on one or more parallel accelerator processors, the method comprising:
    an act of the computer system accessing a function, the function configured to operate over a multi-dimensional matrix of memory cells, the function configured to be invoked as a plurality of threads on at least one parallel accelerator processor, each thread in the plurality of threads configured to operate on a corresponding memory cell;
    an act of the computer system identifying a layout of the plurality of memory cells of the multi-dimensional matrix of memory cells, including identifying how the memory cells map to global memory at the at least one parallel accelerator processor;
    an act of the computer system analyzing the function to identify how each of the plurality of threads access the global memory to operate on corresponding memory cells when invoked over the multi-dimensional matrix of memory cells; and
    an act of the computer system altering the function to utilize a more efficient memory access scheme when accessing the global memory based on the layout of the multi-dimensional matrix and based on analyzing the function, the more efficient memory access scheme increasing coalesced memory access invoked over the multi-dimensional matrix of memory cells, coalesced memory accesses comprising two or more threads accessing the global memory in a single memory transaction.

2. The method as recited in claim 1, wherein the act of altering the function to utilize a more efficient memory access scheme comprises:
    an act of choosing a particular grid orientation that causes an increased number of threads executing in at least one warp of threads to perform a coalesced memory access; and
    an act of re-writing the function to utilize the particular grid orientation.

3. The method as recited in claim 1, wherein the act of altering the function to utilize a more efficient memory access scheme comprises:
    an act of determining that a plurality of threads executing in at least one warp should transpose at least a portion of the multi-dimensional matrix using a coalesced memory access;
    an act of re-writing the function to cause the plurality of threads executing in the at least one warp to copy a block of data from the global memory using a coalesced memory access; and
    an act of re-writing the function to cause the plurality of threads executing in the at least one warp to write the block of data to a tile of thread-shared memory while transposing the block of data.

4. The method as recited in claim 1, wherein the act of altering the function to utilize a more efficient memory access scheme comprises an act of optimizing the function to prioritize uncoalesced accesses to the global memory by optimizing the function to give uncoalesced accesses that occur repeatedly priority over uncoalesced accesses that occur singly.

5. The method as recited in claim 1, wherein the plurality of threads execute as a plurality of thread blocks, the method further comprising:
    an act of the computer system analyzing the function to determine a limit on an amount of shared memory to use when executing the function,
    wherein the act of optimizing the kernel function comprises an act of optimizing the function to limit the number of tiles of shared memory available to each thread block.

6. The method as recited in claim 1, wherein the act of the act of altering the function to utilize a more efficient memory access scheme comprises an act of optimizing the kernel function to:
    identify a plurality of highest priority uncoalesced reads from global memory whose data would fit within available thread-shared memory;
    combine the identified plurality of highest priority uncoalesced reads from global memory into a cooperative coalesced read while writing data read by the cooperative coalesced read into the available thread-shared memory; and
    read from the one or more tiles of thread-shared memory.

7. The method as recited in claim 1, wherein the act of the act of altering the function to utilize a more efficient memory access scheme comprises an act of optimizing the kernel function to:
    identify a plurality of highest priority uncoalesced writes to global memory whose data would fit within available thread-shared memory;
    write data from each of the plurality of highest priority uncoalesced writes to available thread-shared memory; and
    perform a cooperative coalesced write to global memory from the available thread-shared memory.

8. The method as recited in claim 1, wherein the act of the act of altering the function to utilize a more efficient memory access scheme comprises an act of optimizing the kernel function to combine tiles of thread shared memory for memory assesses that use offsets.

9. The method as recited in claim 1, wherein the act of analyzing the function to identify how each of the plurality of threads access the global memory to operate on corresponding memory cells when invoked over the multi-dimensional matrix of memory cells comprises determining which threads execute together as the same warp.

10. The method as recited in claim 1, wherein the act of altering the function to utilize a more efficient memory access scheme comprises an act of optimizing the kernel function to combine multiple coalesced accessed to the same global memory location to a single coalesced access followed by accesses to thread-shared memory.

11. A computer program product for use at a computer system, the computer program product for automatically optimizing a function for execution on one or more parallel accelerator processors, the computer program product comprising one or more computer storage media having stored thereon computer-executable instructions that, when executed at a processor, cause the computer system to perform the method, including the following:
    access a function, the function configured to operate over a multi-dimensional matrix of memory cells, the function configured to be invoked as a plurality of threads on at least one parallel accelerator processor, each thread in the plurality of threads configured to operate on a corresponding memory cell;

identify a layout of the plurality of memory cells of the multi-dimensional matrix of memory cells, including identifying how the memory cells map to global memory at the at least one parallel accelerator processor;

analyze the function to identify how each of the plurality of threads access the global memory to operate on corresponding memory cells when invoked over the multi-dimensional matrix of memory cells; and alter the function to utilize a more efficient memory access scheme when accessing the global memory based on the layout of the multi-dimensional matrix and based on analyzing the function, the more efficient memory access scheme increasing coalesced memory access invoked over the multi-dimensional matrix of memory cells, coalesced memory accesses comprising two or more threads accessing the global memory in a single memory transaction.

12. The computer program product as recited in claim 11, wherein the function is configured to be invoked as a plurality of threads which each operate over a plurality of multi-dimensional matrices.

13. The computer program product as recited in claim 11, wherein the multi-dimensional matrix comprises a three-dimensional matrix.

14. The computer program product as recited in claim 11, wherein the one one or more parallel accelerator processors comprise one or more Graphics Processing Units.

15. The computer program product as recited in claim 11, wherein the plurality of threads execute as a plurality of thread blocks, threads in each thread block sharing the same thread-shared memory.

16. The computer program product as recited in claim 15, wherein threads in the same thread block execute as a plurality of warps.

17. The computer program product as recited in claim 16, wherein threads in the same thread block execute at a same core at a parallel accelerator processor.

18. The computer program product as recited in claim 11, further comprising computer-executable instructions that, when executed at a processor, cause the computer system to directly execute the optimized kernel function.

19. The computer program product as recited in claim 11, further comprising computer-executable instructions that, when executed at a processor, cause the computer system to export the optimized kernel function.

20. A computer system, comprising:
one or more processors; and
one or more computer storage devices having stored thereon computer executable instructions representing a compiler, the compiler including an accessor module, an analysis module, an optimization module, and an output module, wherein the accessor module is configured to access a function, the function being configured to operate over a multi-dimensional matrix of memory cells, the function configured to be invoked as a plurality of threads on at least one parallel accelerator processor to each thread in the plurality of threads configured to operate on a corresponding memory cell;

wherein the analysis module is configured to identify a layout of the plurality of memory cells of the multi-dimensional matrix of memory cells, including being configured to identify how the memory cells map to global memory at the at least one parallel accelerator processor and to analyze the function to identify how each of the plurality of threads access the global memory to operate on corresponding memory cells when invoked over the multi-dimensional matrix of memory cells;

wherein the optimization module is configured to alter the function to utilize an a more efficient access scheme when accessing the global memory based on the layout of the multi-dimensional matrix and based on analyzing the function, the more efficient memory access scheme increasing coalesced memory access when invoked over the multi-dimensional matrix of memory cells by at least choosing an efficient orientation of the multi-dimensional matrix of memory cells, coalesced memory accesses comprising two or more threads accessing the global memory in a single memory transaction; and wherein the output module is configured to output the optimized function for execution by at least one parallel accelerator processor.

* * * * *